United States Patent
Yuan

(10) Patent No.: US 12,379,935 B2
(45) Date of Patent: Aug. 5, 2025

(54) METHOD FOR PACKAGING DRIVER KERNEL MODULE, ELECTRONIC DEVICE AND STORAGE MEDIUM

(71) Applicant: Fulian Precision Electronics (Tianjin) Co., LTD., Tianjin (CN)

(72) Inventor: Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 129 days.

(21) Appl. No.: 18/230,726

(22) Filed: Aug. 7, 2023

(65) Prior Publication Data

US 2024/0168768 A1 May 23, 2024

(30) Foreign Application Priority Data

Nov. 18, 2022 (CN) .......................... 202211449380.8

(51) Int. Cl.
G06F 9/4401 (2018.01)

(52) U.S. Cl.
CPC .......... *G06F 9/4411* (2013.01); *G06F 9/4406* (2013.01)

(58) Field of Classification Search
CPC .............................. G06F 9/4411; G06F 9/4406
See application file for complete search history.

(56) References Cited

U.S. PATENT DOCUMENTS

| | | | | |
|---|---|---|---|---|
| 7,769,990 | B1 * | 8/2010 | Okcu | G06F 11/1469 713/1 |
| 8,060,734 | B1 * | 11/2011 | Newstadt | G06F 9/4406 713/1 |
| 8,250,567 | B2 * | 8/2012 | Gesquiere | G06F 8/656 717/172 |
| 8,725,995 | B1 * | 5/2014 | Kim | G06F 8/66 713/1 |
| 9,823,915 | B1 * | 11/2017 | Maloney | G06F 9/4411 |
| 11,385,923 | B2 * | 7/2022 | Sekman | G06F 9/45558 |
| 2003/0145127 | A1 * | 7/2003 | Unice | G06F 8/71 719/321 |
| 2006/0277402 | A1 * | 12/2006 | Wakabayashi | G06F 9/445 713/1 |
| 2007/0271552 | A1 | 11/2007 | Pulley | |
| 2009/0228881 | A1 * | 9/2009 | Mukker | G06F 8/41 717/176 |
| 2024/0168732 | A1 * | 5/2024 | Yuan | G06F 8/41 |
| 2024/0272912 | A1 * | 8/2024 | Liu | G06F 8/61 |

* cited by examiner

*Primary Examiner* — Aurel Prifti
(74) *Attorney, Agent, or Firm* — ScienBiziP, P.C.

(57) ABSTRACT

A packaging method for a driver kernel module includes: configurating specification file according to the driver kernel module; and packaging the driver kernel module and the specification file into a driver package in a target format. An electronic device and a non-volatile storage medium therein, for performing the above-described method, are also disclosed.

15 Claims, 4 Drawing Sheets

METHOD FOR PACKAGING DRIVER KERNEL MODULE, ELECTRONIC DEVICE AND STORAGE MEDIUM

FIELD

The present disclosure relates to the technical field of computer technology, in particular to a method for packaging driver kernel module, an electronic device, and a storage medium.

BACKGROUND

When loading driver kernel modules in Linux, users need to find the path to the directory where the driver kernel module resides, and enter the instruction to load the driver program manually, thereby achieving the loading of the driver program. After the user wants to start the system, the driver is loaded, which requires manual operation and inconvenient operation.

Therefore, improvement is desired.

DETAILED DESCRIPTION

Figure 1:
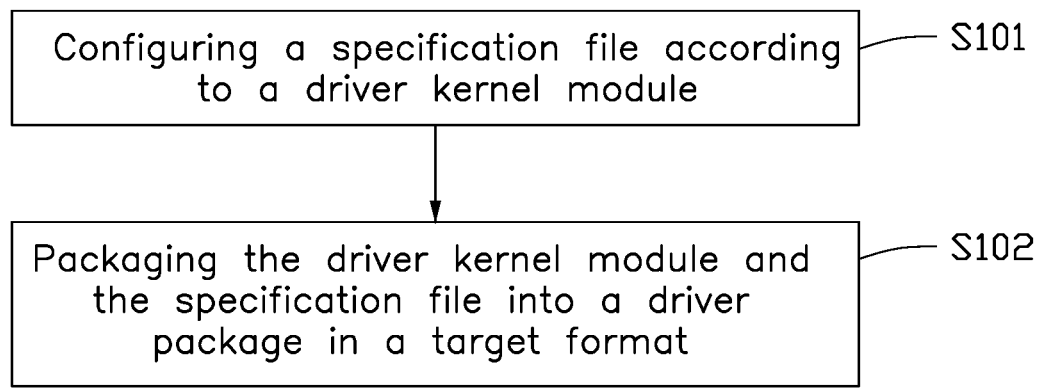
FIG. 1 is flowchart of a method for packaging driver kernel module according to an embodiment of the present disclosure.

When loading driver kernel modules in Linux, users need to find a path to the directory where the driver kernel module resides and enter the instruction to load the driver program manually, thereby achieving the loading of the driver program. After the user wants to start the system, the driver is loaded, which requires manual operation and inconvenient operation.

In order to solve the above problems, the present disclosure provides a method for packaging driver kernel module, an electronic device, and a storage medium, the present disclosure can load a driver program according to a driver package of the target format driver package, thereby enabling the driver program to load automatically. Furthermore, the present disclosure may easily and quickly realize installation, uninstallation, and query of the driver package in standard format.

The following explanations or definitions of the terms used in this specification are provided before explaining the specific implementation methods.

The present disclosure may refer to the software package of the driver program as a driver package.

The driver program is a term used in computer software. The driver program is a program that enables communication between a computer and a hardware device, the driver program is equivalent to an interface of the hardware device, an operating system can only control the operation of hardware devices through this interface. For example, if no driver program is installed on the hardware device, the operating system cannot identify the device and perform operations on the device. The driver programs of various devices can be downloaded from an official website of a hardware device manufacturer, and the downloaded driver programs may be divided into compiled standard system drivers and driver source code packages.

The source code may refer to the most original program code.

The Linux is a type of UNIX operating system. The Linux system is a multi-user, multitasking, multi-threaded, and multi-CPU operating system based on POSIX.

The kernel modules are also called kernel object (ko) files, and a kernel object file may be abbreviated as .ko file. The kernel module is a certain module of the kernel, the kernel may be divided into a plurality of modules, each module representing a certain function of the kernel. When the system needs a certain part of the function, the functional module representing this function may be inserted back into the kernel, and the system can call that part of the function. When the system does not need this part of the functionality, uninstall the kernel module. The system needs the driver program to drive the hardware device, so the existence of the driver program in a form of the kernel module may reduce a size of the system kernel. In the present disclosure, a driver program in the form of a kernel module is called a driver kernel module.

The hardware devices may include displays, input devices, motherboards, expansion cards, power supplies, and central processing units (CPUs).

The redhat package manager (RPM) is a common software package manager based on the Linux systems such as Redhat, Centos, Fedora, it only requires a single instruction to install, uninstall, and query the software packages in the RPM format on the system.

The spec file is a specification file used in the Linux operating system to guide a rpmbuild instruction to build software packages in the RPM format.

The packaging method of the present disclosure may be implemented under the Linux operating system, the Linux operating system may be equipped with an RPM software package manager.

FIG. 1 is a flowchart of a method for packaging driver kernel module in accordance with an embodiment of the present disclosure. The method may include the following steps:

At step S101, configuring a specification file according to a driver kernel module.

The packaging method applied in the Linux operating system is illustrated as an example. The driver programs on the Linux operating system generally exist in a form of the kernel modules, the driver kernel module refers to the driver program that exist in the form of the kernel module. The Linux operating system can directly access the driver kernel module on this Linux operating system.

The specification file refers to the spec file, after the Linux operating system obtains the driver kernel module, the Linux operating system can configure the spec file according to the driver kernel module. After the spec file is configured, the Linux operating system performs actions based on the configured spec file to complete the tasks of the driver package in the RPM format in various stages. The various stages can include pre-compilation stage, compilation stage, pre-installation stage, installation stage, cleaning stage, post-installation stage, pre-uninstall stage and post-uninstall stage. The configuration spec file can be divided into three parts: a first part is a relevant description of the Driver package in the RPM format, a second part is an operation of the driver package in the RPM format at each stage, and a third part is a configuration information of the driver package in the RPM format.

It can be understood that the spec file is a specification file, which explains how the Driver package in the RPM format is configured, which files are installed, the installation directory, and the system level activities called during installation on the Linux operating system. The present disclosure customizes the operation of the driver package in the RPM format in the various stages of the Linux operating system by configuring the spec file.

Firstly, configure the relevant description of the driver package in the RPM format. The relevant description can include: a summary of the content of the driver package in the RPM format, which can be configured using a tag Summary; a name of the driver package in the RPM format, which can be configured using a tag Name; a main version number of the driver program, which can be configured using a tag version; a release serial number of the driver program, which can be configured using a tag Release; an authorization method for the driver can be GPLv2, which can use GPLv2, which can be configured using a tag License; there are several groups in the Driver package in the RPM format that can be configured using the tag group. These tags can store the basic information of the driver package in the RPM format. The Linux operating system can use % define and the tag to define the driver package in the RPM format. For example, % define module <module_name>; % define version <version>; % define kernel %(uname -r). <module_name> and <version> are used to fill in the name and the version of the driver package.

Secondly, configure the operation of the driver package in the RPM format at each stage.

During the pre-compilation stage, the present disclosure can perform operations such as decompressing the driver source code into a driver source code package and generating configuration files for automatic loading at startup, such as generating depmod configuration file and darcut configuration file. During the compilation stage, the present disclosure can perform the operation of compiling the driver source package to compile the driver source code into the driver program. During the installation stage, the present disclosure can perform operations that specify the installation paths for the ko files in the RPM-formatted driver package, the depmod configuration file, and the dracut configuration file. During the cleaning stage, the present disclosure can perform the operation of cleaning up the redundant intermediate files. During the post-installation stage, the present disclosure can perform the depmod and darcut instructions to make the configuration files of depmod and darcut effective. During the post-uninstall stage, the present disclosure can perform the depmod and darcut instructions to invalidate the configuration files of depmod and darcut.

Finally, configure the configuration information for the driver package in the RPM format. The configuration information includes a list of files to be installed and a record of the driver package in the RPM format version changes.

At step S102, packaging the driver kernel module and the specification file into a driver package in a target format.

The spec file is a tool for building the driver package in the RPM format, and the driver package in the target format refers to the driver package in the RPM format. The present disclosure can encapsulate the driver kernel module and the configured spec files into the driver packages in the RPM format using the rpmbuild instruction.

The spec file packages the driver kernel module into the driver package in the RPM format and installs the driver package on the Linux operating system. After the Linux operating system responds to the startup instructions of the Linux operating system, the driver program can automatically load. The Linux operating system applies a software package manager of the driver package in the RPM format, which can control the driver package in the RPM format with simple instructions on the Linux operating system, thereby enabling easy and fast installation, uninstallation, and query of the driver package.

Therefore, the system configures the specification file according to the driver kernel module and packages the driver kernel module and the specification file into a driver package in the target format. The present disclosure customizes the driver package of the target format by configuring a specification file and based on the characteristics of the driver package of the target format, it is possible to control the driver package of the target format with easy instructions on the system, and to easily and quickly realize operations such as installing, uninstalling, and querying the driver package. After installing this driver package on the system, the system responds to system boot instructions to load the driver program based on the driver package in the target format so that the driver program can be loaded automatically.

Figure 2:
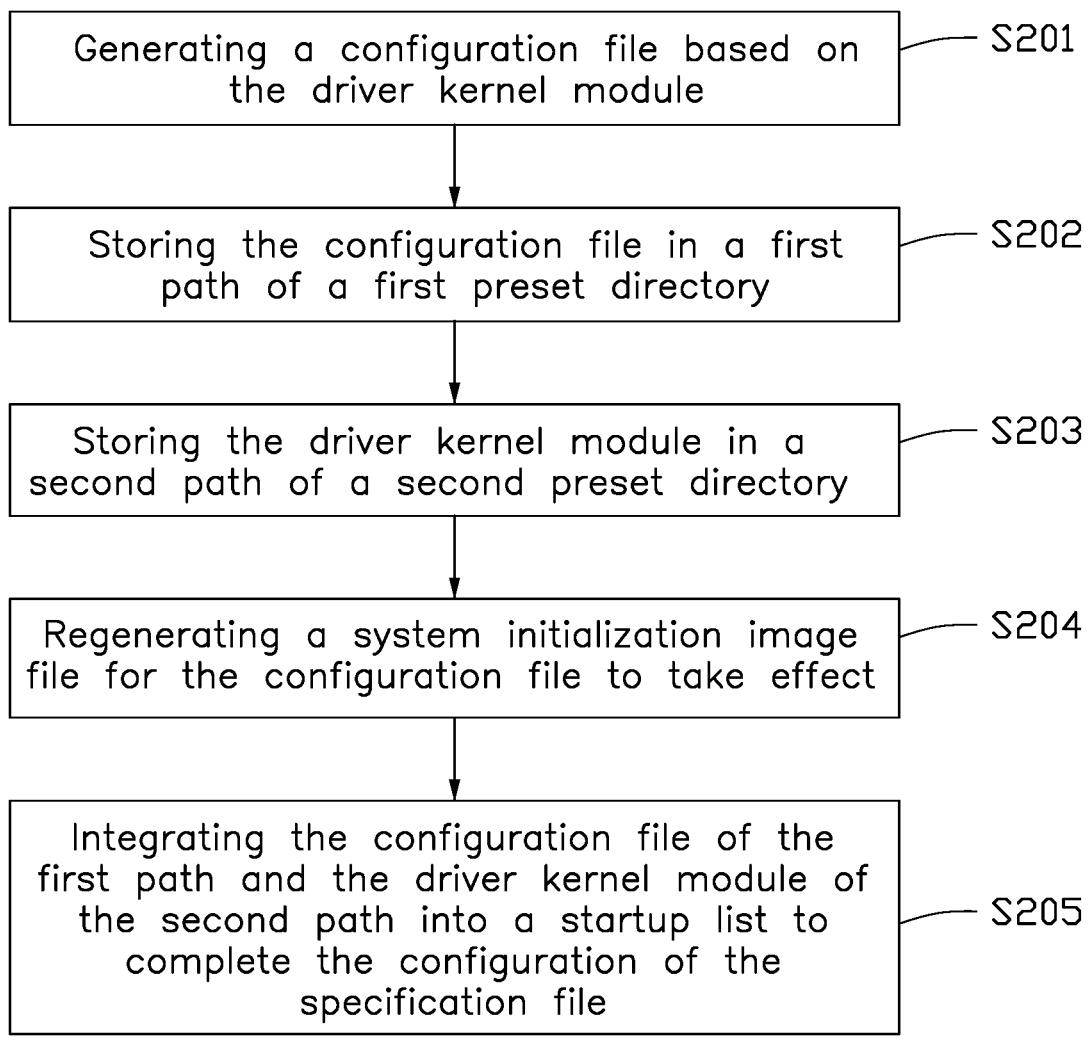
FIG. 2 is a flowchart of the method for packaging driver kernel module according to another embodiment of the present disclosure.

As shown in FIG. 2, in one embodiment, step S101 may include the following steps:

At step S201, generating a configuration file based on the driver kernel module.

To achieve automatic loading upon startup, it is necessary to execute the relevant instructions for system automatic loading, such as depmod instruction and dracut instruction. The configuration file used for automatic loading upon startup refers to the configuration file of the relevant instructions, such as the configuration file for depmod and the configuration file for dracut. The configuration file is a configuration file for the Linux operating system to automatically load instructions, and automatically loading the configuration files enables the driver program to automatically load after startup. During the pre-compilation stage of the configuring spec files, the Linux operating system generates the automatically load configuration file of the driver kernel module. The automatically load configuration file may include the depmod configuration file and the dracut configuration file. For example, the Linux operating system can configure the spec file according to the following code:

echo override %{module} 'uname -r | awk -F "-" '{print $1}''-* weak-updates/% f{module} > $RPM_SOURCE_DIR/%{module}-depmod.conf;
echo add_drivers+=" %{module} ">$RPM_SOURCE_DIR/%{module}-dracut.conf.

In order to build a driver package in the RPM format, it is necessary to first prepare a packaging environment, including preparing directories for storing various files. Before configuring the spec file, the present disclosure can create a working directory of rpmbuild through #rpmdev-setuptree instruction, and various files generated through various instrucitons can be placed in this directory. The configuration file and driver kernel module used for automatic loading on boot can be placed in the working directory of the rpmbuild. $RPM_SOURCE_DIR is the default parameter for RPM, which is the SOURCE path in the rpmbuild directory.

Before installing the driver package in the RPM format, the automatically load configuration file is generated to prepare for the subsequent installation of the driver package in the RPM format. The automatically load configuration file enables the driver program to be loaded automatically after powering on the computer.

Therefore, the present disclosure generates a configuration file for the system to automatically load instructions based on the driver kernel module and configures a specification file. The configuration file is sufficient for the driver program to automatically load after system startup.

At step S202, storing the configuration file in a first path of a first preset directory.

In the installation stage of configuring the spec file, the Linux operating system stores the automatically load configuration file in the BUILDROOT subdirectory of the working directory of rpmbuild, a storage directory where the configuration files are stored in the BUILDROOT subdirectory files are stored. The storage directory has mapped storage paths, such as the storage path etc/depmod. d/%{module}. conf and the storage path/etc/dracut. conf. d. In other words, the first preset directory refers to the storage directory of the configuration files in the working directory of rpmbuild, and the first path refers to the storage path of the configuration files.

At step S203, storing the driver kernel module in a second path of a second preset directory.

The kernel of the Linux operating system has directories for storing files, which are divided into an internal storage directory and an external storage directory. The internal storage directory mapping has an internal storage path, and the external storage directory mapping has an external storage path. The internal storage path may occupy the volume of the kernel, and the external storage path do not affect the volume of the kernel. Specifically, the Linux operating system stores the driver kernel module in the BUILDROOT subdirectory of the working directory of rpmbuild, and the driver kernel module is stored in the external storage path of the kernel of the Linux operating system. The path is a standard external path in the kernel, such as path/lib/modules/% {kernel}/extras. In other words, the second preset directory is the external storage directory, and the second path is the external storage path of the driver kernel module of the kernel of the Linux operating system.

The present disclosure stores the driver kernel module in the external storage path of the kernel of the Linux operating system, which can minimize the impact on the volume of the kernel of the Linux operating system.

At step S204, regenerating a system initialization image file for the configuration file to take effect.

After completing the installation of the driver package in the RPM format and uninstalling the driver package in the RPM format, the Linux operating system can execute the depmod and dracut instructions to regenerate the system initialization image file, and the system initialization image file is the initiramfs file. This makes the automatically load configuration file to take effect after completing the installation of the driver package in the RPM format and become invalid after uninstalling the driver package in the RPM format.

Therefore, the Linux operating system can regenerate the system initialization image file (the initiramfs file), during the post-uninstall stage of configuring spec file and the post-installation stage of configuring spec file.

The present disclosure integrates the configuration file and the driver kernel module into a startup list to complete the detailed steps of configuring the specification file.

At step S205, integrating the configuration file of the first path and the driver kernel module of the second path into a startup list to complete the configuration of the specification file.

Finally, the specification file is configured by integrating the configuration file in the storage path and the driver kernel module in the external storage path of the kernel of the Linux operating system into the startup list.

For example, the Linux operating system may configure a spec file according to the following code:

install -m 644 -D $RPM_SOURCE_DIR/%{module}.ko;
$RPM_BUILD_ROOT/lib/modules/%{kernel}/extra/
%{module}/% N{module}.ko
install -m 644 -D $RPM_SOURCE_DIR/%{module}-
depmod.conf
$RPM_BUILD_ROOT/etc/depmod.d/%{module}.conf
install -m 644 -D $RPM_SOURCE_DIR/%{module}-
dracut.conf
$RPM_BUILD_ROOT/etc/dracut.conf.d/
%{module}.conf Therefore, the present disclosure stores the configuration file in the first path of the first preset directory, stores the driver kernel module in the second path of the second preset directory, and integrates the configuration file of the first path and the driver kernel module of the second path to the startup list. The present disclosure stores the driver kernel module in the second path, which can minimize the size of the kernel of the Linux operating system.

The driver kernel module located in the working directory of rpmbuild can be integrated into the startup list once the automatically load configuration file located in the working directory of rpmbuild has taken effect.

When the Linux operating system configures a spec file, the Linux operating system can place both the automatically load configuration file and the driver kernel module in the working directory of rpmbuild, and package them together into a driver package in the RPM format. When the driver package in the RPM format is installed on a Linux operating system, the Linux operating system integrates the automatically load configuration file and the driver kernel modules into the startup list.

When booting the Linux operating system, the Linux operating system automatically loads the files in the startup list. Therefore, the Linux operating systems place the automatically load configuration file and the driver kernel modules in the working directory of rpmbuild and integrates the automatically load configuration file and the driver kernel modules into the startup list. When booting the Linux operating system, the automatically load configuration file and the driver kernel module will be automatically loaded, thereby automatically loading the driver program.

Therefore, the system integrates the configuration file and driver kernel module into the startup list to configure the specification file. When booting the system, the system loads the files in the startup list, which means loading the configuration file and the driver kernel module, so that the driver program automatically loads.

Figure 3:
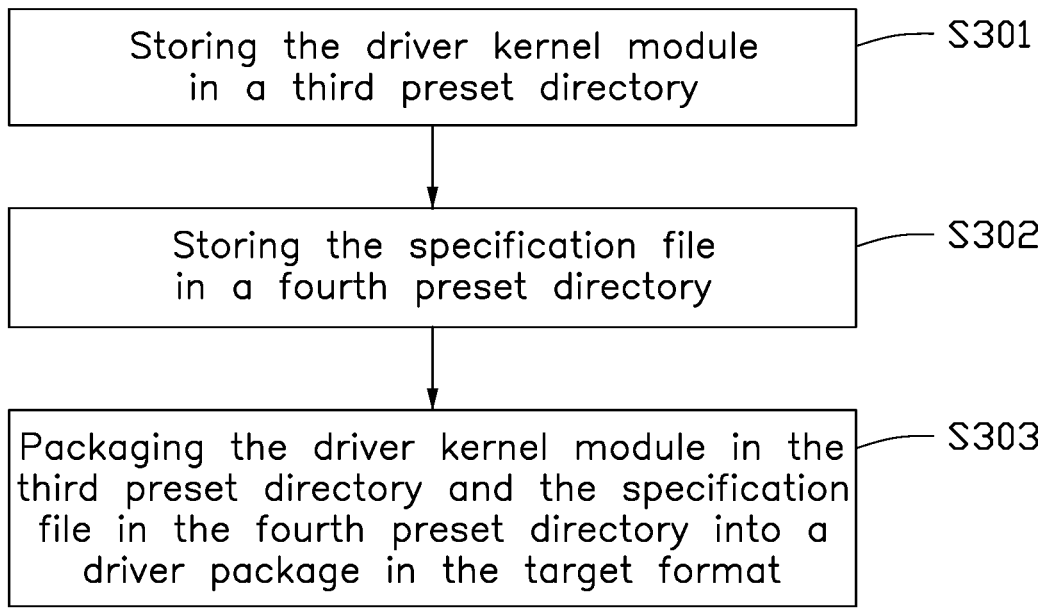
FIG. 3 is a flowchart of the method for packaging driver kernel module according to another embodiment of the present disclosure.

As shown in FIG. 3, in one embodiment, step S102 can include the following steps:

At step S301, storing the driver kernel module in a third preset directory.

The working directory of rpmbuild further includes a directory for storing spec file, which can be expressed as ~/rpmbuild/SPECS in code. The working directory of rpmbuild further includes a directory for storing source code, which can be expressed as ~/rpmbuild/SOURCES/in code. The Working directory of rpmbuild further includes a directory for storing the driver package in the RPM format, which can be expressed as ~/rpmbuild/RPMS/in code. In other words, the third preset directory refers to the storage directory of the source code of the working directory of rpmbuild after the spec file is configured, which can be expressed as ~/rpmbuild/SOURCES/in code. After configuring the spec file, the Linux operating system can store the driver kernel module in the storage directory of the source code.

At step S302, storing the specification file in a fourth preset directory.

The fourth preset directory refers to the storage directory for spec files, which can be expressed as ~/rpmbuild/SPECS in code.

At step S303, packaging the driver kernel module in the third preset directory and the specification file in the fourth preset directory into a driver package in the target format.

The rpmbuild instruction can be used to create the driver package in the RPM format. The Linux operating system can use the rpmbuild bs<spec> instruction to package the configured spec file and the driver kernel module into the driver package in the RPM format.

Therefore, after configuring the spec file and obtaining the driver kernel module, the Linux operating system stores the spec file and the driver kernel module in the working directory of rpmbuild respectively. In the directory where the spec file is stored, the Linux operating system can execute the rpmbuild instruction to generate the driver package in the RPM format, and finally store the driver package in the RPM format in the working directory of rpmbuild.

For example, the Linux operating system stores the configured spec file in /root/rpmbuild/SPECS, stores the driver kernel module in/root/rpmbuild/SOURCES/, and then executes the rpmbuild-bs<spec> instruction in/root/rpmbuild/SPECS to generate the driver package in the RPM format, and the driver package in the RPM format is stored in/root/rpmbuild/RPMS/.

The present disclosure can store the configured spec file and the driver kernel module in a designated directory, thereby making it easy to find the configured spec files in the future and package them into the driver package in the RPM format.

Therefore, the system stores the driver kernel module in the third preset directory, stores the specification file in the fourth preset directory, packages the driver kernel module in the third preset directory and the specification file in the fourth preset directory into a driver package in the target format. The configured specification file and the driver kernel module can be stored in the specified directory, so that it is easy to find the configured specification file subsequently to generate the driver package in the target format.

Optionally, the method may further include the step:

At step S400, defining system parameters according to the driver kernel module.

During the compilation stage of configuring the spec file, the Linux operating system can use tags and % define to define the parameters of the current Linux operating system, the parameters of the current Linux operating system include the name and version of the driver package in the RPM format to be packaged.

For example, configure according to the following code:
% define module <module_name>;
% define version <version>;
% define kernel %(uname -r).

The name of the driver package may be filled in <module_name>, and the version of the driver package may be filled in <version>.

The application defines the system parameters to ensure that the generated driver package in the RPM format conforms to the system environment, thereby preventing the generated driver package in the RPM format from being unable to be installed due to a mismatch with the system environment.

Therefore, the present disclosure defines the system parameters based on the driver kernel module to complete the configuration of the specification file, which can make the generated driver package in the target format conform to the current system environment.

Optionally, step S102 may be followed by the following steps:

At step S501, installing the driver package in the target format.

After applying the packaging method of all or part of the implementation methods of the present disclosure, after packaging into the driver package in the RPM format, install the driver package in the RPM format. Specifically, the present disclosure may find the driver package in the RPM format under a path where the driver package in the RPM format is stored, and execute an install instruction to install the driver package in the RPM format in the Linux operating system, to complete the deployment of the driver program on the Linux operating system.

For example, after finding the driver package in the RPM format in the ~/rpmbuild/RPMS/path and executing the rpm-ivh<RPM> instruction, the driver package in the RPM format is installed in the Linux operating system.

The present disclosure can install the driver package in the RPM format on the Linux operating system with a single instruction, thereby completing the deployment of the driver program on the Linux operating system, which is easy to operate. In other words, the Linux operating system applies the software package manager of the driver package in the RPM format, which can control the driver package in the RPM format with easy instructions on the Linux operating system, and easily and quickly achieve the driver program installation, uninstallation, and query operations.

Optionally, step S501 may be followed by the following steps:

At step S601, loading the driver program according to the driver package in the target format in response to system startup instruction.

At step S602, querying, installing, or uninstalling the driver package in the target format in response to corresponding operation instructions.

After deploying the driver package in the RPM format on the Linux operating system, the user restarts the Linux operating system, the Linux operating system responds to the instructions of the operation and automatically loads the driver program, thereby driving the hardware devices of the Linux operating system to work normally.

The present disclosure can control the driver package in the RPM format with corresponding instructions on the Linux operating system, and can easily and quickly perform operations such as installing, uninstalling, and querying the driver package in the RPM format.

After installing the driver package in the RPM format on the Linux operating system, the user performs an operation to query the relevant information of the driver program, the Linux operating system responds to the instruction of the operation and displays the relevant information of the driver program. The relevant information includes the state and version of the driver program.

For example, the user queries the version of the driver program using the rpm -qa instruction on the Linux operating system, and the Linux operating system responds to the operating instruction of the user, and displays the version information of the driver program.

The driver program on the existing Linux operating system cannot be intuitively queried by users. After deploying the driver package in the RPM format in the present disclosure, the users can directly use the simple instructions corresponding to the software package manager to query the relevant information of the driver program.

After installing the driver package in the target format, the driver program can automatically load in response to the Linux operating system startup instructions, the driver package in the target format can be controlled by the Linux operating system with a single instruction, enabling easy and fast driver installation, uninstallation, or query operations.

Therefore, the system installs the driver package in the target format. After installing the driver package in the target format, the system responds to the system startup instructions and can load the driver program according to the driver package in the target format; alternatively, the system responds e to the corresponding operating instructions of the user, and can query, install, or uninstall the driver package in the target format.

The present disclosure implements all or part of the processes in the methods of the above embodiments and can also be completed by instructing related hardware through a computer program that can be stored in a computer-readable storage medium. When the computer program is executed by a processor, it can implement the steps of each of the above method embodiments. The computer program includes computer program code, which can be in the form of source code, object code, executable files, or some intermediate form. The computer-readable medium may include any entity or device capable of carrying the computer program code, recording medium, USB flash drives, removable hard disks, magnetic disks, optical disks, computer memory, read-only memory (ROM), and random-access memory (RAM).

Figure 4:
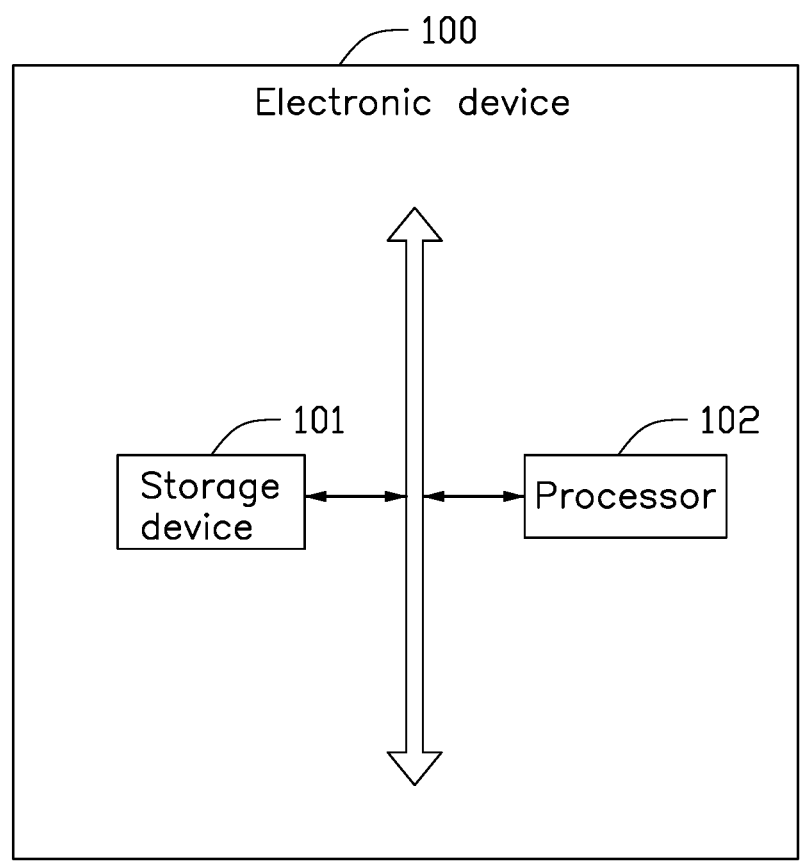
FIG. 4 is a schematic diagram of an electronic device according to an embodiment of the present disclosure.

FIG. 4 illustrates an electronic device 100 in accordance with an embodiment of the present disclosure.

In one embodiment, the electronic device 100 includes a storage device 101 and at least one processor 102. Those skilled in the art should understand that the structure of the electronic device 100 shown in FIG. 4 does not constitute a limitation of the present disclosure. The electronic device 100 may also include other components.

In some embodiments, the electronic device 100 includes a terminal capable of automatically performing numerical calculations and/or information processing in accordance with previously set or stored instructions, and its hardware includes, but is not limited to, microprocessors, application specific integrated circuits, programmable gate arrays, digital processors, and embedded devices. In some embodiments, the storage device 101 is used to store program code and various data. The storage device 101 can include read-only memory (ROM), random access memory (RAM), programmable read-only memory (PROM), erasable programmable read-only memory (EPROM), one time programmable read-only memory (OTPROM), electrically erasable programmable read only memory (EEPROM), compact disc read only memory (CD-ROM), or other optical disk storage, disk storage, magnetic tape storage, or any other computer-readable medium that can be used to carry or store data.

In some embodiments, the at least one processor 102 may include integrated circuits, such as a single packaged integrated circuit, or multiple integrated circuits with the same or different functional packages, including microprocessors, digital processing chips, graphics processors, and combinations of various control chips. The at least one processor 102 is the control unit of the controller, which executes various functions and processes data of the electronic device 100 by running or executing programs or modules stored in the storage device 101, and invoking data stored in the storage device 101. The storage device 101 stores program code, and the at least one processor 102 can call the program code stored in the storage device 101 to perform related functions. In an embodiment of the present disclosure, the storage device 101 stores a plurality of instructions that are executed by the at least one processor 102 to implement the packaging method.

It is understood that the specific implementation of the electronic device 100 can be seen in the above embodiments and will not be discussed here.

The embodiment of the present disclosure also provides a storage medium. The storage medium stores computer instructions that, when run on a computing device, enable the computing device to execute the method for packaging driver kernel module provided by the embodiments.

Ordinary technical personnel in this field can realize that the units and algorithm steps described in combination with the disclosed embodiments in this article can be implemented in electronic hardware, or a combination of the computer software and the electronic hardware. In the several embodiments provided in the disclosure, it should be understood that the disclosed system, device, and method can be implemented through other means. For example, the device implementation described above is only schematic.

The functional units of the present disclosure can be integrated into one processing unit, or each unit can exist physically separately, or two or more units can be integrated into one unit, and note that the above are only the preferred embodiments and technical principles used in the present disclosure.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A method for packaging driver kernel module comprising:
    generating a configuration file according to the driver kernel module;
    storing the configuration file in a first path of a first preset directory, storing the driver kernel module in a second path of a second preset directory; wherein the first path is a storage path of the configuration file, the second path is an external storage path of the driver kernel module of a system kernel; and
    configuring a specification file according to the configuration file of the first path and the driver kernel module of the second path;
    packaging the driver kernel module and the specification file into a driver package in a target format; and
    defining system parameters based on the driver kernel module.

2. The method of claim 1, further comprising:
    integrating the configuration file in the first path and the driver kernel module in the second path into a startup list to configure the specification file.

3. The method of claim 1, wherein after generating the configuration file, the method further comprises:
    regenerating a system initialization image file to make the configuration file effective.

4. The method of claim 1, wherein packaging the driver kernel module and the specification file into the driver package in the target format, comprises:
    storing the driver kernel module in a third preset directory,
    storing the specification file in a fourth preset directory, and
    packaging the driver kernel module in the third preset directory and the specification file in the fourth preset directory into the driver package in the target format.

5. The method of claim 1, wherein after packaging the driver kernel module and the specification file into the driver package in the target format, the method further comprises:
    installing the driver package in the target format.

6. The method of claim 5, wherein after installing the driver package in the target format, the method further comprises:
    automatically loading a driver program according to the driver package in the target format in response to system startup instruction, or
    querying, installing, or uninstalling the driver package in the target format in response to corresponding operation instructions.

7. An electronic device comprising:
    a storage device; and
    at least one processor, wherein the storage device stores one or more programs, when executed by the at least one processor, the one or more programs cause the at least one processor to:
        generate a configuration file according to the driver kernel module;
        store the configuration file in a first path of a first preset directory, store the driver kernel module in a second path of a second preset directory; wherein the first path is a storage path of the configuration file, the second path is an external storage path of the driver kernel module of a system kernel; and
        configure a specification file according to the configuration file of the first path and the driver kernel module of the second path;
        package the driver kernel module and the specification file into a driver package in a target format; and
        define system parameters based on the driver kernel module.

8. The electronic device of claim 7, wherein the at least one processor is further caused to:
    integrating the configuration file in the first path and the driver kernel module in the second path into a startup list to configurate the specification file.

9. The electronic device of claim 7, wherein the at least one processor is further caused to:
    regenerating a system initialization image file to make the configuration file effective.

10. The electronic device of claim 7, wherein the at least one processor is further caused to:
    defining system parameters based on the driver kernel module.

11. The electronic device of claim 7, wherein the at least one processor is further caused to:
    storing the driver kernel module in a third preset directory;
    storing the specification file in a fourth preset directory; and
    packaging the driver kernel module in the third preset directory and the specification file in the fourth preset directory into the driver package in the target format.

12. The electronic device of claim 7, wherein the at least one processor is further caused to:
    automatically a loading driver program according to the driver package in the target format in response to system startup instruction, or
    querying, installing, or uninstalling the driver package in the target format in response to corresponding operation instructions.

13. A non-transitory storage medium having stored thereon instructions that, when executed by a processor of an electronic device, causes the processor to perform a packaging method, wherein the method comprises:
    generating a configuration file according to the driver kernel module;
    storing the configuration file in a first path of a first preset directory, storing the driver kernel module in a second path of a second preset directory; wherein the first path is a storage path of the configuration file, the second path is an external storage path of the driver kernel module of a system kernel; and
    configuring a specification file according to the configuration file of the first path and the driver kernel module of the second path;
    packaging the driver kernel module and the specification file into a driver package in a target format; and
    defining system parameters based on the driver kernel module.

14. The non-transitory storage medium of claim 13, further comprising:
    integrating the configuration file in the first path and the driver kernel module in the second path into a startup list to configure the specification file.

15. The non-transitory storage medium of claim 13, wherein after generating the configuration file, the method further comprises:
    regenerating a system initialization image file to make the configuration file effective.

* * * * *